J. MARETTE.
REVERSING CLUTCH.
APPLICATION FILED JUNE 22, 1914.
1,170,653.
Patented Feb. 8, 1916.
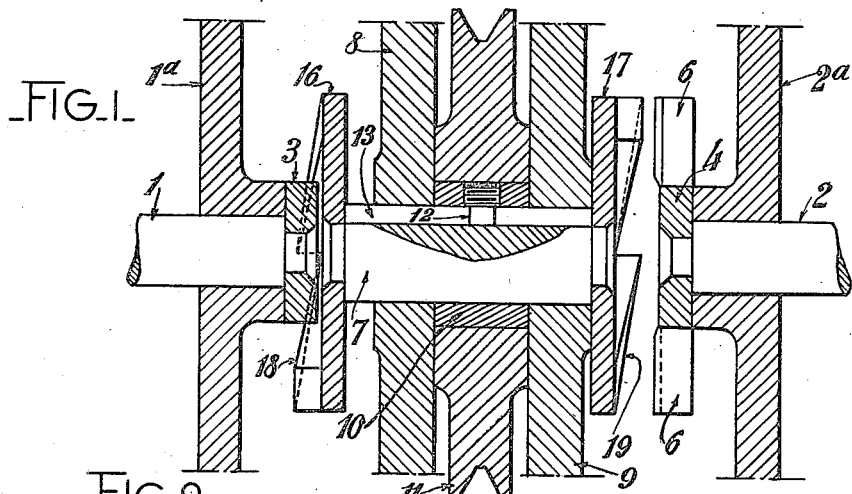
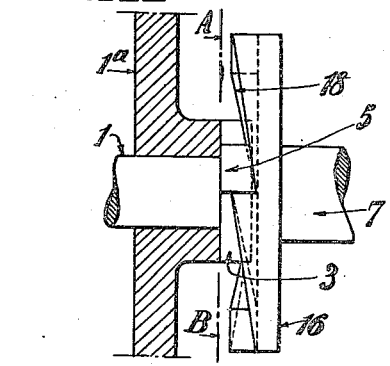
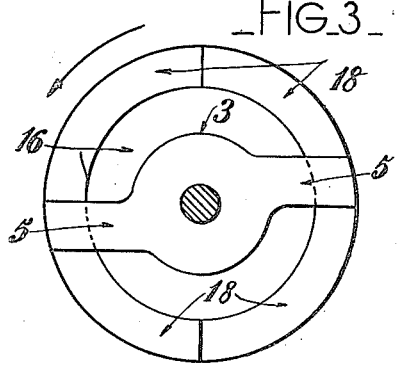
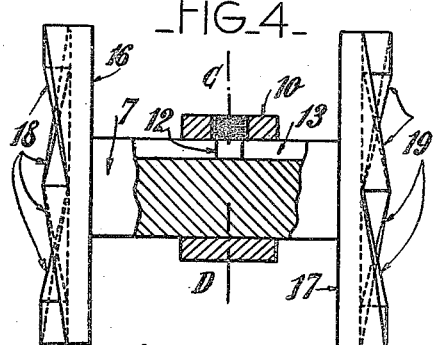
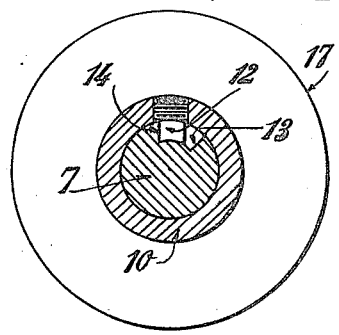
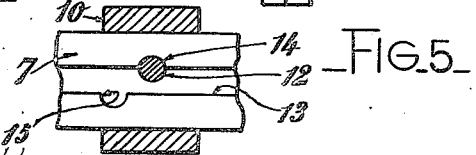
Inventor
Jacques Marette

UNITED STATES PATENT OFFICE.

JACQUES MARETTE, OF VINCENNES, FRANCE, ASSIGNOR TO COMPAGNIE GENERALE DES ETABLISSEMENTS PATHE FRERES, PHONOGRAPHE ET CINEMATOGRAPHE, OF PARIS, FRANCE.

REVERSING CLUTCH.

1,170,653. Specification of Letters Patent. Patented Feb. 8, 1916.

Application filed June 22, 1914. Serial No. 846,458.

*To all whom it may concern:*

Be it known that I, JACQUES MARETTE, citizen of the Republic of France, residing at 30 Rue des Vignerons, Vincennes, Seine, in the Republic of France, have invented new and useful Improvements in Reversing Clutches, of which the following is a specification.

My invention relates generally to an improvement in clutches, and has especial reference to a clutch capable of being reversed as to its direction of operation.

The device is designed for general application to mechanism or parts thereof where a reversing clutch is capable of use, but I have found the novel clutch to be particularly advantageous in its application to cinematographic apparatus for automatically winding the picture film in both directions on the storage spools.

An embodiment of the invention is illustrated by way of example in the accompanying drawing, in which:

Figure 1 is a longitudinal axial section of the device. Fig. 2 is an elevation partly in section. Fig. 3 is a cross-section on the line A—B in Fig. 2. Fig. 4 is an elevation partly in section of the sliding shaft. Fig. 5 is a partial plan view of the shaft, and Fig. 6 is a cross-section on the line C—D, Fig. 4.

The spools on which the films of cinematographic apparatus are stored, are keyed respectively upon the spindles 1 and 2 placed in alinement, but at a certain distance one from the other. These spindles are journaled in suitable bearings 1ᵃ and 2ᵃ and carry at their extremities plates 3 and 4 each provided with two opposed arms 5 and 6, respectively. Between these plates 3 and 4 an auxiliary shaft 7 is mounted in line with the shafts 1 and 2 and journaled in suitable bearings 8 and 9 in which it is able to slide axially. Between these bearings the shaft 7 carries a sleeve 10 on which a grooved pulley 11 is mounted, this sleeve 10 comprises a pin or gudgeon 12, the head of which moves in a longitudinal slot 13 in the shaft 7. This slot 13 comprises two semi-cylindrical notches or recesses 14 and 15 upon its opposite faces for the reception of the gudgeon 12. Upon the ends of the shaft 7 are keyed plates or clutches 16 and 17 which are each provided with ratchet teeth 18 and 19 respectively, forming on one side a helicoidal incline. The teeth 18 and 19 are inverse in direction.

The operation of the device is as follows: Assuming that the device is acting to wind a film on the spool keyed on the spindle 1 for example, the pulley 11 rotates in the direction of the arrow (Fig. 3); the gudgeon 12 is situated in the recess 14 and it drives the shaft 7 in such a manner that the plate 16 rotates in the direction indicated by the arrow (Fig. 3). In these conditions the teeth of this plate 16 are engaged with the arms 5 of the plate 3 and drive this plate and consequently the spindle 1 which carries the first storage spool.

In order to wind the film on to the second spool keyed on the spindle 2, it is only necessary to reverse the direction of the pulley 11 by some appropriate means. At the moment at which this reversal of direction takes place, the sleeve 10 has a slight angular displacement relatively to the shaft 7; the gudgeon 12 leaves its recess 14 and strikes against the opposite smooth wall of the slot 13 and the shaft 7 is driven by the pulley 11 in the opposite direction to its previous rotation. Consequently the teeth 18 on the plate 16 present an ascending path for the arms 5 of the plate 3 and as the spindle 1 possesses considerable inertia, so that it and its arms 5 remain fixed, the result is that as the shaft 7 rotates the contact between the inclines of the teeth 18 and the arms 5 will gradually press back the shaft 7 which will slide axially; as a result, the teeth 19 of the plate 17 will approach the arms 6 keyed on the spindle 2 of the second spool. At the moment at which the contact of the teeth 18 of the plate 16 with the arms 5 ceases, the gudgeon 12 will enter the second recess 15 in the slot 13, the arms 6 are then clutched to the plate 17 and the spindle 2 carrying the second spool will be driven. By again changing the direction of rotation of the pulley 11 the spool keyed upon the spindle 1 will again be rendered operative automatically and so on in succession. The device is therefore exceedingly simple and practical and does not comprise any of the complicated or delicate parts hitherto employed.

It will of course be understood that the invention is not confined to the embodiment described and illustrated and in particular the device is applicable for other automatic controls analogous to those of cinematograph spools.

Having now described my invention, what I claim as new and desire to secure by Letters Patent is:

1. In a device for the purpose specified, two spindles arranged on a line and spaced from each other, a sliding shaft between the spindles and in alinement with the same, clutch arms on the spindles, ratchet plates on the ends of the shaft for engagement with the clutch arms, the teeth on one of said plates having opposite directions to the teeth on the other plate and a pulley adapted to rotate with the shaft, substantially as described and for the purpose set forth.

2. In a device for the purpose specified, two spindles arranged on a line and spaced from each other, a sliding shaft between the spindles and in alinement with the same, clutch arms on the spindles, ratchet plates on the ends of the shaft for engagement with the clutch arms, the teeth on one of said plates having opposite directions to the teeth on the other plate, a pulley mounted on the shaft, means for preventing the pulley from moving axially and a pin on said pulley, said pin being adapted to slide in a longitudinal groove in the shaft, substantially as described and for the purpose set forth.

3. In a device for the purpose specified, two spindles arranged on a line and spaced from each other, a sliding shaft between the spindles and in alinement with the same, clutch arms on the spindles, ratchet plates on the ends of the shaft for engagement with the clutch arms, the teeth on one of said plates having opposite directions to the teeth on the other plate, a pulley mounted on the shaft, means for preventing the pulley from moving axially, and a pin on said pulley, said pin being adapted to slide in a longitudinal groove in the shaft, the walls of the groove having two recesses into which the pin is adapted to engage, substantially as described and for the purpose set forth.

In testimony whereof I have signed my name to this specification in the presence of two subscribing witnesses.

JACQUES MARETTE.

Witnesses:
CHAS. P. PRESSLY,
ALFRED GEHET.